(12) United States Patent
Ismael et al.

(10) Patent No.: US 9,680,862 B2
(45) Date of Patent: Jun. 13, 2017

(54) TRUSTED THREAT-AWARE MICROVISOR

(71) Applicant: FireEye, Inc., Milpitas, CA (US)

(72) Inventors: Osman Abdoul Ismael, Palo Alto, CA (US); Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 73 days.

(21) Appl. No.: 14/602,023

(22) Filed: Jan. 21, 2015

(65) Prior Publication Data

US 2016/0006756 A1 Jan. 7, 2016

Related U.S. Application Data

(60) Provisional application No. 62/019,701, filed on Jul. 1, 2014.

(51) Int. Cl.
*H04L 29/06* (2006.01)
*G06F 21/57* (2013.01)
(Continued)

(52) U.S. Cl.
CPC .......... *H04L 63/1441* (2013.01); *G06F 21/50* (2013.01); *G06F 21/57* (2013.01);
(Continued)

(58) Field of Classification Search
CPC .......... H04L 63/1441; H04L 29/06877; H04L 29/06884; G06F 21/577; G06F 21/50; G06F 21/57; G06F 21/60
(Continued)

(56) References Cited

U.S. PATENT DOCUMENTS

| | | | |
|---|---|---|---|
| 8,418,230 B1* | 4/2013 | Cornelius | G06F 15/80 |
| | | | 712/1 |
| 8,799,997 B2* | 8/2014 | Spiers | H04L 63/0218 |
| | | | 713/2 |

(Continued)

FOREIGN PATENT DOCUMENTS

| | | |
|---|---|---|
| WO | WO 2012-177464 A1 | 12/2012 |
| WO | WO 2013-091221 A1 | 6/2013 |

OTHER PUBLICATIONS

Common Criteria for Information Technology Security Evaluation, Part 3: Security assurance components Version 3.1, Revision 4, CCMB-2012,-Sep. 2012, 233 pages.

(Continued)

*Primary Examiner* — Hadi Armouche
*Assistant Examiner* — Shahriar Zarrineh
(74) *Attorney, Agent, or Firm* — Cesari and McKenna, LLP

(57) ABSTRACT

A trusted threat-aware microvisor may be deployed as a module of a trusted computing base (TCB) that also includes a root task module configured to cooperate with the microvisor to load and initialize one or more other modules executing on a node of a network environment. The root task may cooperate with the microvisor to allocate one or more kernel resources of the node to those other modules. As a trusted module of the TCB, the microvisor may be configured to enforce a security policy of the TCB that, e.g., prevents alteration of a state related to security of the microvisor by a module of or external to the TCB. The security policy of the TCB may be implemented by a plurality of security properties of the microvisor. Trusted (or trustedness) may therefore denote a predetermined level of confidence that the security property is demonstrated by the microvisor.

30 Claims, 7 Drawing Sheets

(51) Int. Cl.
*G06F 21/50* (2013.01)
*G06F 21/60* (2013.01)

(52) U.S. Cl.
CPC ............ *G06F 21/577* (2013.01); *G06F 21/60* (2013.01); *H04L 29/06877* (2013.01); *H04L 29/06884* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 8,863,279 | B2* | 10/2014 | McDougal | G06F 21/56 713/188 |
| 8,910,238 | B2* | 12/2014 | Lukacs | G06F 21/53 713/164 |
| 8,984,478 | B2* | 3/2015 | Epstein | G06F 12/1475 717/110 |
| 2002/0019941 | A1 | 2/2002 | Chan et al. | |
| 2006/0021029 | A1* | 1/2006 | Brickell | G06F 21/51 726/22 |
| 2006/0130060 | A1 | 6/2006 | Anderson et al. | |
| 2006/0236127 | A1* | 10/2006 | Kurien | G06F 9/5077 713/193 |
| 2008/0028124 | A1* | 1/2008 | Tago | G06F 9/5016 711/6 |
| 2008/0244569 | A1* | 10/2008 | Challener | G06F 21/57 718/1 |
| 2009/0044274 | A1* | 2/2009 | Budko | G06F 21/53 726/24 |
| 2009/0204964 | A1* | 8/2009 | Foley | G06F 21/53 718/1 |
| 2010/0235647 | A1* | 9/2010 | Buer | G06F 21/52 713/187 |
| 2011/0047542 | A1* | 2/2011 | Dang | G06F 9/468 718/1 |
| 2011/0296412 | A1* | 12/2011 | Banga | G06F 9/5027 718/1 |
| 2012/0047576 | A1* | 2/2012 | Do | G06F 12/1483 726/22 |
| 2012/0198514 | A1* | 8/2012 | McCune | G06F 21/85 726/1 |
| 2012/0216242 | A1* | 8/2012 | Uner | G06F 21/51 726/1 |
| 2012/0260345 | A1* | 10/2012 | Quinn | G06F 21/57 726/26 |
| 2012/0297057 | A1* | 11/2012 | Ghosh | G06F 21/575 709/224 |
| 2013/0347131 | A1* | 12/2013 | Mooring | G06F 9/45558 726/29 |
| 2014/0075522 | A1* | 3/2014 | Paris | G06F 21/44 726/5 |
| 2014/0130158 | A1* | 5/2014 | Wang | G06F 21/566 726/23 |
| 2014/0208123 | A1* | 7/2014 | Roth | G06F 21/602 713/189 |
| 2014/0325644 | A1* | 10/2014 | Oberg | G06F 21/51 726/22 |
| 2014/0351810 | A1* | 11/2014 | Pratt | G06F 9/45545 718/1 |
| 2014/0359239 | A1* | 12/2014 | Hiremane | G06F 21/575 711/163 |
| 2015/0172300 | A1* | 6/2015 | Cochenour | H04L 63/1425 726/23 |
| 2015/0317495 | A1* | 11/2015 | Rodgers | G06F 21/71 713/192 |

OTHER PUBLICATIONS

Fernandez, et al. "Towards a verified component platform." *Proceedings of the Seventh Workshop on Programming Languages and Operating Systems*. ACM, 2013, 7 pages.

Fernandez, et al. "CAmkES glue code semantics." Apr. 2013, 45 pages.

Garfinkel, et al. "Terra: A virtual machine-based platform for trusted computing," *ACM SIGOPS '03*. ACM, Oct. 2003, 14 pages.

Gebhardt, Carl. "Towards Trustworthy Virtualisation: Improving the Trusted Virtual Infrastructure." Technical Report RHUL-MA-2011-10, Mar. 17, 214 pages.

Gollmann, Dieter. "Why trust is bad for security." *Electronic notes in theoretical computer science* 157.3,2006, pp. 3-9.

Hepburn, et al. "Execution Contexts for Determining Trust in a Higher-Order pi-Calculus." School of Computing, University of Tasmania Technical Report R-01-2003, 2003, 36 pages.

Klein, et al. "seL4: Formal verification of an OS kernel." *Proceedings of the ACM SIGOPS 22nd symposium on Operating systems principles*. ACM, 2009, pp. 207-220.

Latham, Donald C. "Department of Defense Trusted Computer System Evaluation Criteria." *Department of Defense* (1986), 116 pages.

McCune, et al. "Flicker: An execution infrastructure for TCB minimization." *ACM SIGOPS Operating Systems Review*. vol. 42, No. 4. ACM, 2008, 14 pages.

McCune, et al. "TrustVisor: Efficient TCB reduction and attestation." *CyLab, Carnegie Mellon University, CMU-CyLab-09-003*, Mar. 9, 2009 (revised Mar. 10, 2010), 17 pages.

Mohammad, et al. "A formal approach for the specification and verification of trustworthy component-based systems." *ACTS Research Group, ACTS Report Series*, May 2009, 73 pages.

Mohammad et al. "A component-based development process for trustworthy systems." *ACTS Research Group, ACTS Report Series*, Sep. 2009, 48 pages.

Parker, Timothy. *Protecting Cryptographic Keys and Functions from Malware Attacks*. Diss, Texas Univ at San Antonio Dept of Computer Science, 2010, 116 pages.

Parno, Bryan, Thesis—"Trust extension as a mechanism for secure code execution on commodity computers." 2010, 203 pages.

Santos, et al. "Trusted language runtime (TLR): enabling trusted applications on smartphones." *Proceedings of the 12th Workshop on Mobile Computing Systems and Applications*. ACM, 2011, 6 pages.

Santos, Nuno, et al. "Using ARM trustzone to build a trusted language runtime for mobile applications." *Proceedings of the 19th international conference on Architectural support for programming languages and operating systems*. ACM, 2014, 14 pages.

Sewell, et al. "Translation validation for a verified OS kernel." *ACM SIGPLAN Notices* 48.6, 2013, 11 pages.

Stumpf, et al. "An approach to a trustworthy system architecture using virtualization." *Autonomic and trusted computing*. Springer Berlin Heidelberg, 2007, pp. 191-202.

Tews, Hendrik. "Micro hypervisor verification: Possible approaches and relevant properties." *NLUUG Voorjaarsconferentie*, Apr. 2007, 14 pages.

Wikipedia—"Haskell (programming language)" description, printed Oct. 4, 2013, 11 pages.

Wikipedia—"Hoare logic" description, printed Oct. 4, 2013, 7 pages.

PCT Notification of Transmittal of the International Search Report and the Written Opinion of the International Searching Authority, or the Declaration, International Searching Authority, International Application No. PCT/US2015/038552, mailed Sep. 16, 2015, 10 pages.

* cited by examiner

TRUSTED THREAT-AWARE MICROVISOR

RELATED APPLICATION

The present application claims priority from commonly owned Provisional Patent Application No. 62/019,701, entitled Trusted Threat-Aware Microvisor, filed on Jul. 1, 2014, the contents of which are incorporated herein by reference.

BACKGROUND

Technical Field

The disclosure herein relates to virtualization systems and, more specifically, to a trusted threat-aware microvisor of a virtualization system.

Background Information

A virtual machine monitor (VMM) or hypervisor may be a hardware or software entity configured to create and run a software implementation of a computing platform or machine, i.e., a virtual machine. The hypervisor may be implemented as a type 1 VMM executing directly on native hardware of the computing platform, or a type 2 VMM executing within an operating system environment of the platform. The hypervisor may be further deployed in a virtualization system that fully simulates (virtualizes) physical (hardware) resources of the computing platform. Such a full virtualization system may support execution of a plurality of operating system instances inside a plurality of virtual machines, wherein the operating system instances share the hardware resources of the platform. The hypervisor of the full virtualization system may manage such sharing by hiding the hardware resources of the computing platform from users (e.g., application programs) executing on each operating system instance and, instead, providing an abstract, virtual computing platform. For example, a hardware resource, such as a network interface card (NIC), may be shared by enabling each virtual machine (and its operating system instance) to access a virtualized instance of the resource, i.e., a virtual NIC.

A virtualization system may include a hypervisor that creates other virtual machines, each of which executes an independent instance of an operating system. Malicious code may be prevented from compromising resources of the system through the use of policy enforcement and containment analysis that isolates execution of the code within a virtual machine to block or inhibit its execution within the system (i.e., outside of the virtual machine). However, the hypervisor itself may be a target of malicious code and, hence, succumb to infiltration or alteration by malicious code due to an unforeseen security flaw or vulnerability. Therefore, there is a need for a malware resistant virtualization system that is highly immune to exploits of unknown security vulnerabilities.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
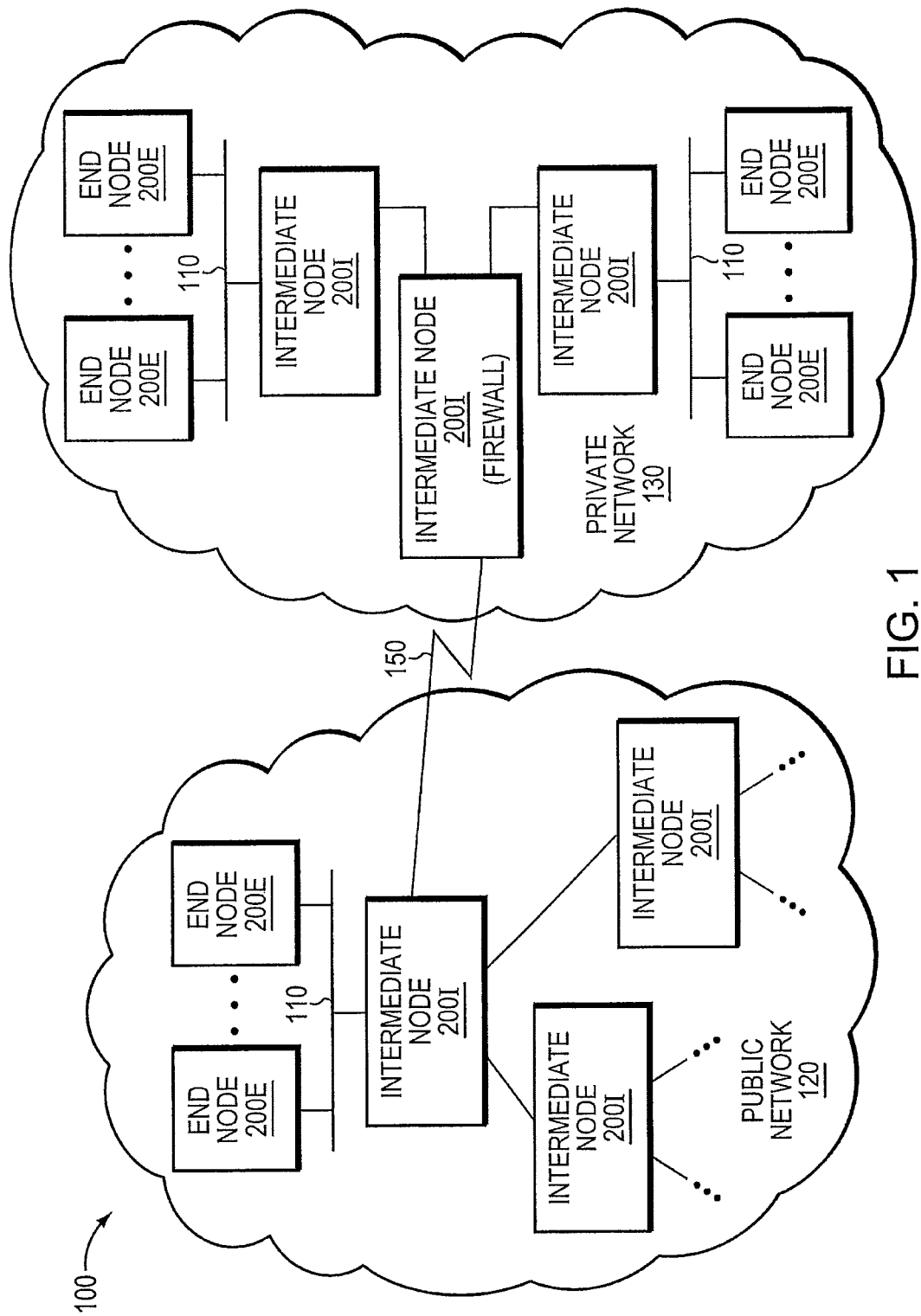
FIG. 1 is a block diagram of a network environment that may be advantageously used with one or more embodiments described herein.

The embodiments herein provide a trusted threat-aware microvisor that may be deployed in a virtualization system configured to facilitate run-time security analysis, including exploit and malware detection as well as threat intelligence collection, associated with one or more operating system processes executing on a node of a network environment. The trusted threat-aware microvisor (hereinafter "microvisor") may be embodied as a light-weight module disposed or layered beneath (underlying) an operating system kernel executing on the node to control privileges (i.e., access permissions or capabilities) to kernel resources, such as one or more central processing units (CPUs), network interfaces, memory, and/or devices, of the node. Illustratively, the microvisor may be configured to control access to one or more of the resources in response to a request by an operating system process to access the resource. As such, the microvisor may operate, inter alia, as a micro-hypervisor ("microvisor").

In an embodiment, the microvisor is a module of a trusted computing base (TCB) that also includes a root task module (hereinafter "root task") configured to cooperate with the microvisor to load (create) and initialize one or more other modules executing on the CPU of the node. The root task may further cooperate with the microvisor to allocate one or more of the kernel resources to those other modules. In this context, allocation of the kernel resources may include creation of (maximal) capabilities that specify an extent to which each module may access its allocated kernel resource(s). An example of such a module is a type 0 virtual machine monitor (VMM 0) configured to expose the kernel resources of the node to the operating system kernel.

As a trusted module of the TCB, the microvisor is illustratively configured to enforce a security policy of the TCB that, e.g., prevents alteration of a state related to security of the microvisor by a module (e.g., software entity) of or external to an environment in which the microvisor operates, i.e., the TCB. For example, an exemplary security policy may provide, "modules of the TCB shall be immutable," which may be implemented as a security property of the microvisor, an example of which is no module of the TCB modifies a state related to security of the microvisor without authorization. In an embodiment, the security policy of the TCB may be implemented by a plurality of security properties of the microvisor. That is, the exemplary security policy may be also implemented (i.e., enforced) by another security property of the microvisor, another example of which is no module external to the TCB modifies a state related to security of the microvisor without authorization. As such, one or more security properties of the microvisor may operate concurrently to enforce the security policy of the TCB.

Illustratively, the microvisor may manifest (i.e., demonstrate) the security property in a manner that enforces the security policy. Accordingly, verification of the microvisor to demonstrate the security property necessarily enforces the security policy, i.e., the microvisor may be trusted by demonstrating the security property. As used herein, trusted (or trustedness) denotes a predetermined level of confidence that the security property is demonstrated by the microvisor. The predetermined level of confidence, in turn, is based on an assurance (i.e., grounds) that the microvisor demonstrates the security property. Therefore, manifestation denotes a demonstrated implementation that assurance is provided regarding the implementation based on an evaluation assurance level, i.e., the more extensive the evaluation, the greater the assurance level.

To support (and maintain) such trustedness, a chain of loading may be configured to securely launch the microvisor as a first software entity loaded into the memory of the node during a boot process. In an embodiment, a unified extensible firmware interface (UEFI) implementation may be extended to provide the chain of loading to securely launch the microvisor for deployment on the node. Illustratively, the UEFI may then load the root task of the TCB prior to loading any other software entity, such as VMM 0 or the operating system kernel. The chain of loading provided by the UEFI may be further configured to authenticate the microvisor code prior to launching.

In an embodiment, trustedness of the microvisor may be verified by subjecting the TCB (i.e., microvisor and root task) to enhanced verification analysis prior to deployment on the node. Enhanced verification may be configured to ensure that the TCB conforms to an operational model with an appropriate level of confidence over an appropriate range of activity (e.g., inputs, outputs, and operational states). The operational model may then be configured to analyze conformance of the microvisor to the security property, i.e., to determine whether the microvisor demonstrates the security property. A combination of conformance by the microvisor to the operational model and to the security property provides assurance (i.e., grounds) for the level of confidence and, thus, verifies trustedness. For example, trustedness (i.e., a predetermined level of confidence in manifestation of the security property) of the microvisor may be verified (i.e., confidence elevated) by demonstrating that an instruction issued by a module external to the TCB and having one or more arguments configured to alter an expected behavior or state of the microvisor related to the security property results in a violation (i.e., generation of a capability violation) such that the instruction is rejected (reply with error code) or ignored and prevented from execution by the microvisor.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise network. The networks 120, 130 illustratively include a plurality of network links and segments connected to a plurality of nodes 200. The network links and segments may embody local area networks (LANs) 110 and wide area networks (WANs) 150, including wireless networks, interconnected by intermediate nodes 200I, such as network switches or routers, to form an internetwork of nodes. The LANs 110 may, in turn, interconnect end nodes 200E embodied as endpoints. In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol (HTTP), may be advantageously used with the embodiments herein. In the case of private network 130, the intermediate node 200I may include a firewall or other network device configured to limit or block certain network traffic in an attempt to protect the endpoints from unauthorized users. Unfortunately, such attempts often fail to protect the endpoints, which may be compromised nonetheless.

Figure 2:
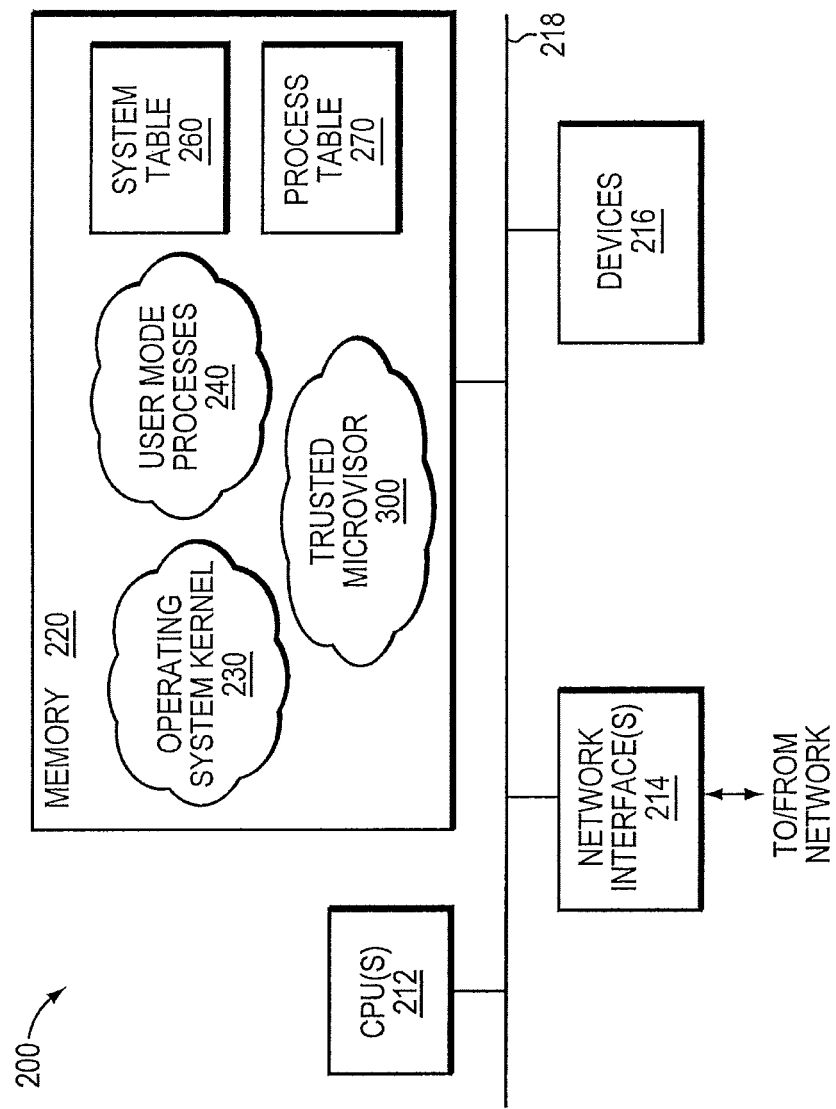
FIG. 2 is a block diagram of a node that may be advantageously used with one or more embodiments described herein.

FIG. 2 is a block diagram of a node 200, e.g., an end node 200E or intermediate node 200I, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include a human interface device (such as a display and associated (graphical) user interface, keyboard, trackball or mouse), storage devices, and/or other types of input/output (I/O) or peripheral devices. Each network interface 214 may contain the mechanical, electrical and signaling circuitry needed to connect the node to the network 120, 130 thereby to facilitate communication over the network. To that end, the network interface 214 may be configured to transmit and/or receive messages using a variety of communication protocols including, inter alia, TCP/IP and HTTP.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as trusted threat-aware microvisor 300, and manipulate the data structures, such as system table 260 and process table 270. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif. and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the application programs may be implemented via user mode processes 240 of the kernel 230. As used herein, a process (e.g., a user mode process) is an instance of software program code (e.g., an application program) executing in the operating system that may be separated (decomposed) into one or more of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code/processes/programs being embodied as modules consisting of hardware, software, firmware, or combinations thereof.

Trusted Threat-Aware Microvisor

Figure 3:
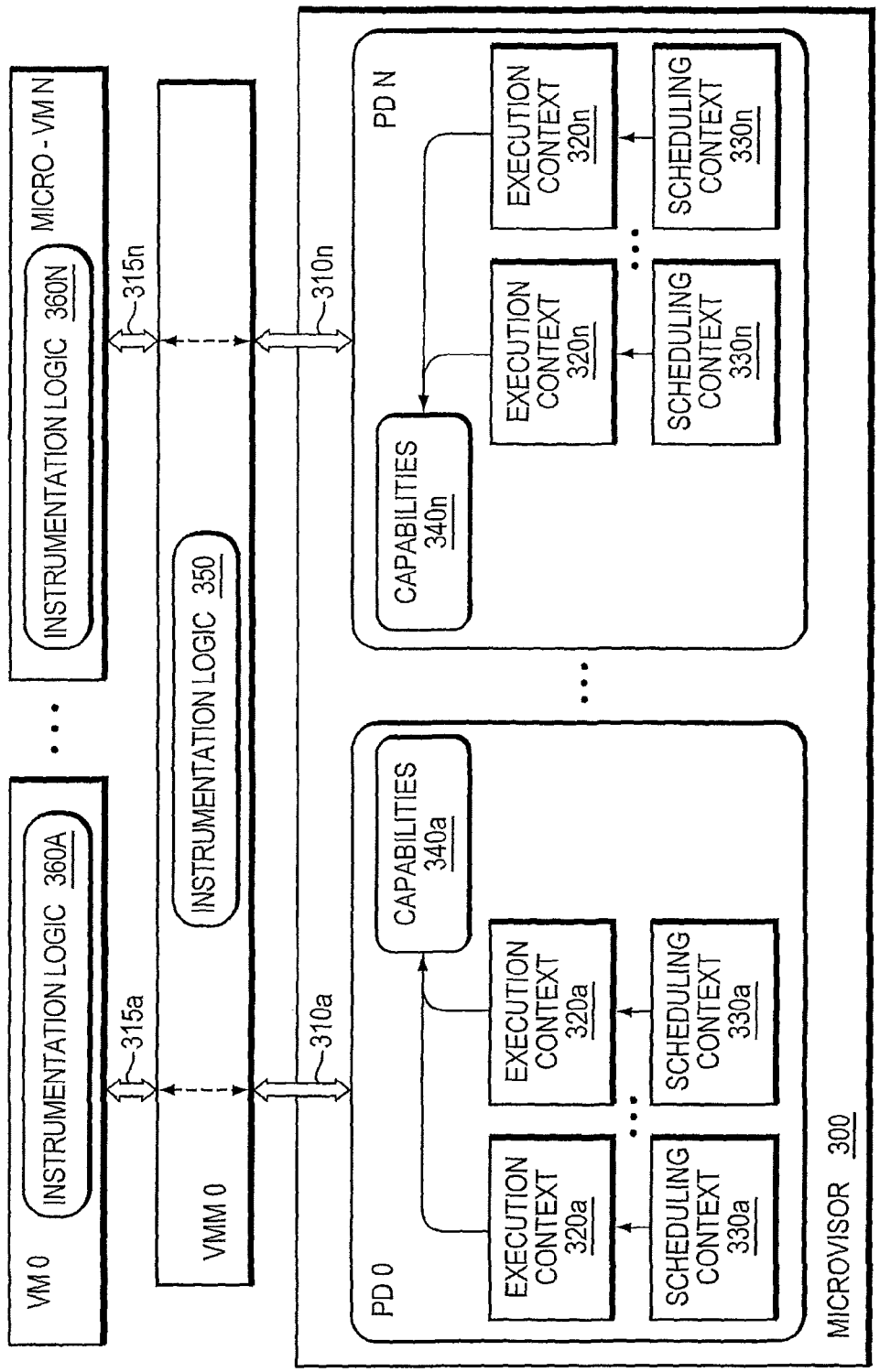
FIG. 3 is a block diagram of a trusted, threat-aware microvisor that may be advantageously used with one or more embodiments described herein.

The embodiments herein provide a trusted, threat-aware microvisor that may be deployed in a virtualization system configured to facilitate run-time security analysis, including exploit and malware detection as well as threat intelligence collection, associated with one or more operating system processes executing on the node 200 of the network environment 100. FIG. 3 is a block diagram of the trusted, threat-aware microvisor 300 that may be advantageously used with one or more embodiments described herein. The trusted threat-aware microvisor (hereinafter "microvisor") may be embodied as a light-weight module disposed or layered beneath (underlying, i.e., directly on native hardware) the operating system kernel 230 executing on the node to virtualize the hardware and control privileges (i.e., access control permissions or capabilities) to kernel (e.g., hardware) resources of the node 200 that are typically controlled by the operating system kernel. That is, the microvisor may be implemented in an operationally efficient (i.e., light-weight) manner that maintains user experience (i.e., little performance degradation) at the node. Illustratively, the kernel resources may include (physical) CPU(s) 212, memory 220, network interface(s) 214 and devices 216. The microvisor may be configured to control access to one or more of the resources in response to a request by an operating system process to access the resource. As such, the microvisor may operate, inter alia, as a micro-hypervisor ("microvisor").

As a light-weight module, the microvisor may provide a virtualization layer having less functionality than a typical hypervisor. Accordingly, the microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360A directed to determination of an exploit and malware in any suspicious operating system process (kernel or user mode). Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315a and 310a.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. An interception point may thus include, inter alia, a memory access request, a function call or a system call. For example in response to an interception point, VMM 0 may assume control over the operating system kernel 230 to enable monitoring of activity (including examination of a state) of the process to determine its suspiciousness and to enable detection of exploits or other potentially malicious behavior of malware. Suspiciousness may thus denote anomalous behavior of a process or its interception point (e.g., system call) that is not expected during run-time and, therefore, may indicate a certain probability of being an exploit or malware. Illustratively, the instrumentation logic 350 may include a classifier (not shown) that determines whether a process is suspicious (and categorize the activity) using pre-defined anomalous behaviors (monitored activity) of verified exploits and malware. Examples of a threat-aware microvisor, a VMM 0 and a micro-virtual machine are described in U.S. patent application Ser. No. 14/229,533 titled Threat-Aware Microvisor by Osman et al. filed Mar. 28, 2014.

An exploit may thus be construed broadly as information (e.g., executable code, data, one or more commands) that attempts to take advantage of a computer program or system vulnerability in order to execute malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed broadly as computer code that is executed by an exploit to harm or co-opt operation of an electronic device or misappropriate, modify or delete data. Conventionally, malware may often be designed with malicious intent.

As described herein, a system call provides an interception point at which a switch in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the microvisor to detect anomalous behavior which may be used in determining an exploit. As used herein, the term "micro" VM denotes a virtual machine serving as a container that is restricted to a process (as opposed to VM 0 which is spawned as a container for the entire operating system). Such spawning of a micro-VM may result in creation of an instance of another module (i.e., micro-VM N) that is substantially similar to VM 0, but with different (e.g., additional) instrumentation logic 360N illustratively directed to determination of an exploit in the suspicious process by, e.g., monitoring its behavior.

In an embodiment, the spawned micro-VM illustratively encapsulates an operating system process, such as user mode process 240. The process may include one or more threads that may be encapsulated by the spawned micro-VM. In another embodiment, two or more related processes (e.g., sharing a user mode resource, such as memory) may be encapsulated by the micro-VM. In terms of execution, operation of the process is controlled and synchronized by the operating system kernel 230; however, in terms of access to kernel resources, operation of the encapsulated process is controlled by VMM 0. Notably, there is no sharing of kernel resources among spawned micro-VMs. That is, the resources appear to be isolated within each spawned micro-VM such that each respective encapsulated process appears to have exclusive control of the resources. In other words, access to kernel resources is synchronized among the micro-VMs and VM 0 by VMM 0 rather than virtually shared. Accordingly, VMM 0 may contain computer executable instructions executed by the CPU 212 to perform operations that initialize and implement the instrumentation logic 350, as well as operations that spawn, configure and control VM 0 and any of a plurality of micro-VMs (including instrumentation logic 360A-N). Similar to VM 0, each micro-VM may be configured to communicate with the microvisor (via VMM 0) over privileged interfaces 315n and 310n. Notably, the privileged interfaces 310a-n and 315a-n may be embodied as a set of defined hyper-calls, as described further herein.

In an embodiment, the microvisor 300 may be organized to include a plurality of protection domains (e.g., PD 0-N) illustratively bound to VM 0 and one or more micro-VMs, respectively. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process 240) and, thus, is a representation of the process. Accordingly, the microvisor may provide a protection domain for the process and its run-time threads executing in the operating system. The main protection domain (PD0) of the microvisor controls all of the kernel resources available to the operating system kernel 230 (and, hence, the user mode process 240) of VM 0 via VMM 0 and, to that end, may be associated with the services provided to the user mode process by the kernel 230, such as information in the process table 270. The spawned micro-VM (e.g., micro-VM N) is illustratively associated with (bound to) a copy of PD 0 (e.g., PD N) which, in turn, may be bound to the process, wherein such binding may occur through memory context switching.

In response to a decision to spawn the micro-VM N, VMM 0 may issue a hyper-call over interface 310a to the microvisor requesting creation of the protection domain PD N. Upon receiving the hyper-call, the microvisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities 340n associated with the kernel resources. As used herein, a capability is a protection (access control permission) associated with a kernel resource. For example, the capabilities 340n for PD N may limit or restrict access to one or more of the kernel resources as instructed through one or more hyper-calls from, e.g., VMM 0 and/or micro-VM N over interface 310a,n to the microvisor. Accordingly, the microvisor 300 may contain computer executable instructions executed by the CPU 212 to perform operations that initialize, clone and configure the protection domains. Each protection domain PD 0-N may include one or more execution contexts 320a-n, each of which is tightly linked to a respective scheduling context 330a-n. Each execution context 320a-n further interacts with the capabilities 340a-n, whose contents specify access control permissions (i.e., protecting access) to the kernel resources. Illustratively, the capabilities may be organized as a list of access permissions for each kernel resource, although those of skill in the art will understand that other data structures may be used to organize the access permissions.

As used herein, an execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. As described herein, violation of a capability in a protection domain may be an interception point, which returns control to the VM (e.g., VM 0 or micro-VM N) bound to the protection domain.

Advantageously, the microvisor 300 may be organized as separate protection domain containers for the operating system kernel 230 (PD 0) and one or more operating system processes (PD N) to facilitate further monitoring and understanding of behaviors of the process and its threads. Such organization of the microvisor also enforces separation between the protection domains to control the activity of the monitored process. Moreover, the microvisor 300 may enforce access to the kernel resources through the use of variously configured capabilities 340 of the separate protection domains. Unlike previous virtualization systems, separation of the protection domains to control access to kernel resources at a process granularity enables detection of anomalous behavior of an exploit. That is, in addition to enforcing access to kernel resources, the microvisor enables analysis of the operation of a process within a spawned micro-VM to detect exploits or other malicious code threats that may constitute malware.

Assume a user mode process 240 has one or more threads that run on one or more CPUs 212. Each thread has an associated execution context 320 that defines its state. When executing on a CPU 212, the thread may attempt to access a resource (a memory page). VMM 0 may instruct the microvisor 300 to configure the access permission to the memory page according to a definition of the capability within the protection domain bound to the process executing the thread. Assume further that the capability specifies that a protection domain (e.g., PD 0) can have only read-only access to the memory page. If the CPU 212 attempts to write to that memory page, i.e., a write access, a trap (e.g., an exception, such as a page fault or general protection fault) may be generated by the CPU and the microvisor 300 may report the trap (via an exception handler) to VMM 0. VMM 0 may decide that such write access should be allowed and instructs the microvisor to allow the access. Alternatively, VMM 0 may decide that such write access warrants further analysis and spawns micro-VM N. VMM 0 may then issue a hyper-call to the microvisor 300 requesting cloning of PD 0 to create PD N (for the spawned micro-VM N) and further requesting a different set of capabilities for PD N to further monitor the process 240 (i.e., the capabilities of the protection domain bound to micro-VM N may be altered). In an embodiment, the different set of capabilities may be specified by instrumentation logic 360N of the spawned micro-VM N. The instrumentation logic 360N may specify the different set of capabilities (via one or more hyper-calls over interfaces 315n, 310n) in order to receive further reports of any violations of capabilities (e.g., traps) and then specify the type of action to take in response to those reports.

For example, the instrumentation logic 350 of VMM 0 may specify a set of capabilities for PD 0 (via a hyper-call) that is different from the capabilities specified for PD N by the instrumentation logic 360N of micro-VM N (via a different hyper-call). Illustratively, the capabilities of PD N may be more restricted than those of PD 0 in order to capture behavior not otherwise monitored by PD 0. Nevertheless, PD 0 may have temporarily elevated protection requiring limited capabilities due to, e.g., a malicious rootkit executing in the operating system kernel 230. In an embodiment, the different set of capabilities requested by micro-VM N for the cloned PD N may pertain to certain kernel resources, such as memory regions (as opposed to memory pages of the regions). Here, the capabilities may not be configured to define access permissions at the granularity of memory pages (e.g., 4K bytes) because of the substantial memory resources (i.e., page table entries) needed to accommodate sufficient pages to cover large memory regions. Accordingly, in an embodiment, a region of memory may be associated with certain permissions (read-only, write-only) as defined by the capabilities and micro-VM N may subsequently "fine-grain" (e.g., enlarge or shrink) that memory region to enable read or write only permissions to memory pages within the region.

Trusted Computing Base (TCB)

Figure 4:
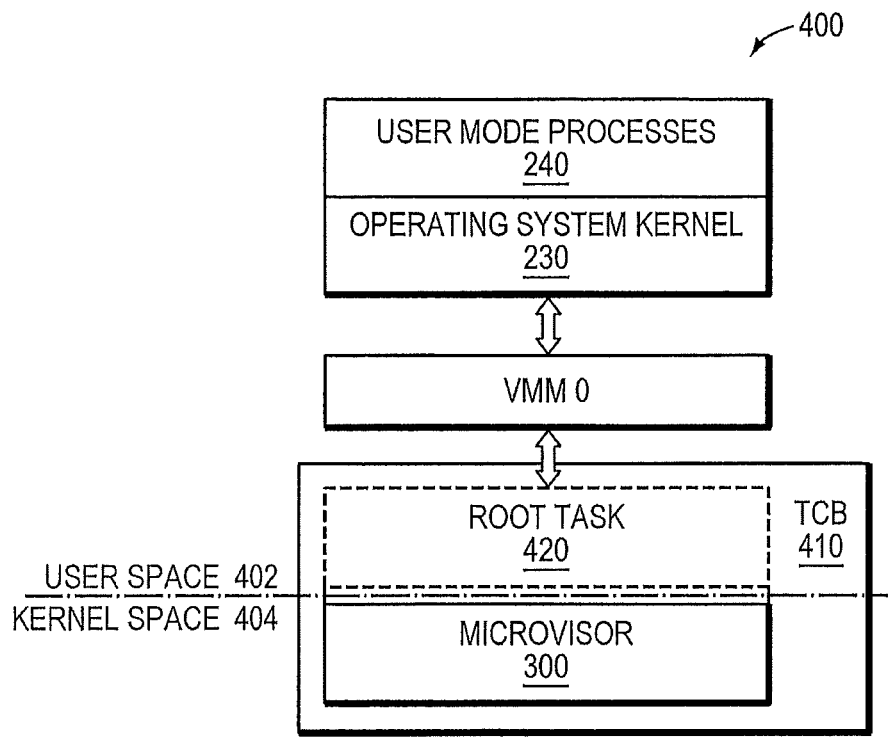
FIG. 4 is a block diagram of a micro-virtualization architecture including a trusted computing base (TCB) that may be advantageously used with one or more embodiments described herein.

In an embodiment, the microvisor may be stored in memory as a module of a trusted computing base that also includes a root task module (hereinafter "root task") configured to cooperate with the microvisor to create (i.e., load) one or more other modules executing on the CPU of the node. FIG. 4 is a block diagram of a micro-virtualization architecture 400 including the trusted computing base (TCB) 410 that may be advantageously used with one or more embodiments described herein. Illustratively, the micro-virtualization architecture 400 may organize the memory 220 as a user space 402 and a kernel space 404. The microvisor 300 may be disposed as a relatively small code base (e.g., approximately 9000-10,000 lines of code) that underlies the operating system kernel 230 and executes in the kernel space 404 of the architecture 400 to control access to the kernel resources for any operating system process (kernel or user mode). Notably, the microvisor 300 executes at the highest privilege level of the hardware (CPU) thereby to virtualize access to the kernel resources of the node in a light-weight manner.

The user mode processes 240 and operating system kernel 230 may execute in the user space 402 of the micro-virtualization architecture 400, although it will be understood to those skilled in the art that one or more of the user mode processes may execute in another address space defined by the operating system kernel. Illustratively, the operating system kernel 230 may execute under control of the microvisor 300 at a privilege level (i.e., a logical privilege level) lower than a highest privilege level of the microvisor, but at a higher CPU privilege level than that of the user mode processes 240. In addition, VMM 0 and its spawned VMs (e.g., VM 0 and micro-VM N) may execute in user space 402 of the architecture 400 as processes having a relatively larger code base (e.g., approximately 20,000-30,000 lines of code) than the microvisor, primarily due to the instrumentation logic 350, 360. As a type 0 virtual machine monitor, VMM 0 (and its spawned VM 0 and micro-VMs) may execute at the highest (logical) privilege level of the microvisor 300. That is, VMM 0 (and its spawned VM 0 and micro-VMs) may operate under control of the microvisor at the highest microvisor privilege level, but may not directly operate at the highest CPU (hardware) privilege level.

In an embodiment, the root task 420 may be disposed as a relatively small code base (e.g., approximately 1000 lines of code) that overlays the microvisor 300 (i.e., underlies VMM 0) and executes in the user space 402 of the architecture 400. Through cooperation (e.g., communication) with the microvisor, the root task 420 may also initialize (i.e., initially configure) the loaded modules executing in the user space 402. To that end, the root task 420 may execute at the highest (absolute) privilege level of the microvisor.

Illustratively, the root task 420 may communicate with the microvisor 300 to allocate the kernel resources to the loaded user space modules. In this context, allocation of the kernel resources may include creation of, e.g., maximal capabilities that specify an extent to which each module (such as, e.g., VMM 0) may access its allocated resource(s). For example, the root task 420 may communicate with the microvisor 300 through instructions to allocate memory and/or CPU resource(s) to VMM 0, and to create capabilities that specify maximal permissions allocated to VMM 0 when attempting to access (use) the resource(s). Such instructions may be provided over the privileged interface 310 embodied as one or more hyper-calls. Notably, the root task 420 is the only (software or hardware) entity that can instruct the microvisor with respect to initial configuration of such resources.

In an embodiment, the root task 420 may be implemented as a "non-long lived" process that terminates after creation and initial configuration of the user space processes (modules). The non-long lived nature of the root task is depicted by dash lining of the root task 420 in FIG. 4. Illustratively, the root task 420 is the first user space process to boot (appear) during power-up and initialization of the node, including loading and initial configuration of the user space modules and their associated capabilities; the root task then terminates (disappears). The root task 420 may thereafter be re-instantiated (reappear) during a reboot process, which may be invoked in response to an administrative task, e.g. update of VMM 0. Notably, the root task 420 may only appear and operate on the node in response to a (re)boot process, thereby enhancing security of the TCB 410 by restricting the ability to (re)initialize the microvisor 300 after deployment on the node 200.

As a trusted module of the TCB, the microvisor 300 is illustratively configured to enforce a security policy of the TCB that, e.g., prevents (obviates) alteration or corruption of a state related to security of the microvisor by a module (e.g., software entity) of or external to an environment in which the microvisor 300 operates, i.e., the TCB 410. For example, an exemplary security policy may provide, "modules of the TCB shall be immutable," which may be implemented as a security property of the microvisor, an example of which is no module of the TCB modifies a state related to security of the microvisor without authorization. In an embodiment, the security policy of the TCB 410 may be implemented by a plurality of security properties of the microvisor 300. That is, the exemplary security policy may be also implemented (i.e., enforced) by another security property of the microvisor, another example of which is no module external to the TCB modifies a state related to security of the microvisor without authorization. As such, one or more security properties of the microvisor may operate concurrently to enforce the security policy of the TCB.

Illustratively, the microvisor 300 may manifest (i.e., demonstrate) the security property in a manner that enforces the security policy. Accordingly, verification of the microvisor to demonstrate the security property necessarily enforces the security policy, i.e., the microvisor 300 may be trusted by demonstrating the security property. Trusted (or trustedness) may therefore denote a predetermined level of confidence that the microvisor demonstrates the security property (i.e., the security property is a property of the microvisor). It should be noted that trustedness may be extended to other security properties of the microvisor, as appropriate. Furthermore, trustedness may denote a predetermined level of confidence that is appropriate for a particular use or deployment of the microvisor 300 (and TCB 410). The predetermined level of confidence, in turn, is based on an assurance (i.e., grounds) that the microvisor demonstrates the security property. Therefore, manifestation denotes a demonstrated implementation that assurance is provided regarding the implementation based on an evaluation assurance level, i.e., the more extensive the evaluation, the greater the assurance level. Evaluation assurance levels for security are well-known and described in *Common Criteria for Information Technology Security Evaluation Part* 3: *Security Assurance Components*, September 2012, Ver 3.1 (CCMB-2012-09-003). For example, evaluation assurance level 7 includes formal design verification and test as confirmed independently (i.e., by a third party).

Figure 5:
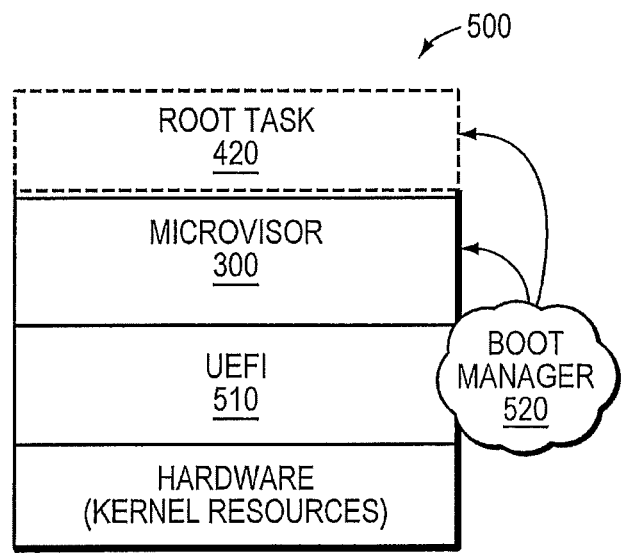
FIG. 5 is a block diagram illustrating a chain of loading that may be advantageously used with one or more embodiments described herein.

In an embodiment, trustedness may include both (i) manifestation of the security property in the microvisor code (e.g., no inherent security flaw) as a static attribute, as well as (ii) manifestation of the security property while the code executes on the CPU (e.g., no alteration by an exploit) as a dynamic attribute. That is, trustedness may include manifestation of the security property as both static and dynamic attributes. As such, secure loading of trusted code contributes to overall trustedness, i.e., a predetermined level of confidence that the security property manifests in the microvisor 300 as deployed on the node. To support (and maintain) such trustedness, a chain of loading may be configured to securely launch the microvisor 300 as a first software entity loaded into memory 220 of node 200 during a boot process. FIG. 5 is a block diagram illustrating a chain of loading 500 that may be advantageously used with one or more embodiments described herein. Illustratively, a unified extensible firmware interface (UEFI 510) implementation (i.e., a Basic Input Output System, BIOS) may be extended to provide the chain of loading 500 to securely launch the microvisor 300 for deployment on the node. After loading the microvisor 300, the UEFI 510 may load the root task 420 of the TCB 410 prior to loading any other software entity, such as VMM 0 or the operating system kernel 230. The chain of loading 500 provided by the UEFI 510 may be further configured to authenticate the microvisor code prior to launching. It should be noted that the UEFI is stored in firmware and, thus, is not to be construed as the first software entity loaded during a boot process.

In an embodiment, loading of the microvisor 300 and root task 420 is performed by a UEFI loader, e.g., boot manager 520, in accordance with an "early loading" procedure. The early loading procedure is illustratively provided by the hardware platform, e.g., including the UEFI 510, as part of an initialization (power-up) and boot sequence. Broadly stated, a power on self-test (POST) procedure may be invoked and executed by the CPU 212 in response to powering-on of the node 200. Firmware of the UEFI 510 may then be loaded to initialize the hardware (including the kernel resources) of the node prior to booting of software program code, such as UEFI application programs. The firmware may then invoke the boot manager 520 to launch one or more of the UEFI application programs, e.g., from a storage device. Illustratively, the first UEFI application program launched by the boot manager is the microvisor 300 and the second UEFI application program launched immediately thereafter is the root task 420. The boot manager 520 may thus control the boot order and location of the microvisor 300 and root task 420 by, e.g., configuring the memory 220, constructing any necessary data structures (such as system table 260 for run-time and boot services) and configuring interrupt interfaces (e.g., storage devices).

Enhanced Verification

In an embodiment, trustedness of the microvisor 300 may be verified by subjecting the TCB 410 (i.e., the microvisor and root task) to enhanced verification analysis prior to deployment on the node. Illustratively, the enhanced verification is performed in a computing environment (e.g., including processing and memory resources to accommodate execution of the software programs constituting the enhanced verification system described herein) that are separate and apart from the network environment deploying the trusted microvisor. Enhanced verification may be configured to ensure that the TCB 410 conforms to an operational model (e.g., constructed with key elements of the code base) with an appropriate level of confidence over an appropriate range of activity (e.g., inputs, outputs, and operational states). The operational model may be a sufficient specification of the behavior of the microvisor as modeled in a typed Lambda calculus, e.g., a pure functional programming language such as Haskell and OCaml. For example, the operational model may include sufficient detail to specify the hyper-calls (e.g., how hyper-call parameters are encoded in binary form) and to describe, e.g., in abstract logical terms, the effect of each hyper-call. It should be noted that the operational model is not an implementation of the microvisor (e.g., 'C++' source code), but rather a functional specification of desired effects (e.g., effects of each hyper-call) on the behavior of the microvisor. The operational model may be rendered executable by generating suitable functional programming language code (e.g., Haskell and OCaml) from a theorem prover (e.g., Coq or Isabelle). For example, a Haskell to 'C' translator may be used to generate C or C++ code, which is then compiled to machine code. Alternatively, machine code may be generated directly (i.e., compiled) from the functional programming language code, e.g., OCaml. In addition, interpreted functional programming languages (e.g., Haskell bytecodes) also may be used. It should be noted that the executable operational model may be used for automated consistency verification (e.g., compliance testing) between the operational model and the TCB, as described herein.

The theorem prover may provide an environment to verify the security property as a theorem with respect to (against) the operational model (i.e., logically prove the security property in a model domain). Illustratively, the security property may be entered into the theorem prover as a thereom (e.g., trustedness of the microvisor) to be verified against the operational model using, e.g., Hoare logic. The theorem prover may then be used to determine whether the operational model demonstrates the security property (as both static and dynamic attributes) and, thus, the security policy. In response, the operational model may be modified when the security property is not demonstrated. For example, failure to demonstrate the security property may be static (e.g., a coding error) or dynamic (e.g., deficient of protection, such as insufficient checking of invalid hyper-call parameters). In other words, the operational model (i.e., functional specification) of the microvisor 300 may be iteratively modified until the security property is demonstrated. In this manner assurance is provided that the TCB (e.g., microvisor) demonstrates the security property, thus yielding the predetermined level of confidence that the TCB 410 manifests the security policy. Notably, assurance of the consistency between the operational model and the code base of the TCB is also used to achieve a sufficient level of confidence (i.e., trustedness) that the TCB demonstrates the security policy. Therefore, the operational model may serve as a convenient and efficient proxy to verify both correctness and manifestation of the security property.

Illustratively, formal verification of the TCB involves: (i) mathematical and logical verification (e.g., by humans) of the operational model against the security property (i.e., manifestation of the security property); (ii) development of the code base (e.g., by humans) to comply with the operational model (e.g., iteratively modify the code base to achieve manifestation of the security property); (iii) comprehensive compliance testing (preferably by automation) to ensure consistency between the code base and the operational model; and (iv) verification of the hardware/firmware of the node. For example, a 10,000 lines of code software stack (e.g., TCB 410 including the microvisor 300 and root task 420) may require as many as hundreds of man years of effort to perform the unwieldy and complex human intensive task of formal verification (without the hardware verification indicated in (iv) above) on the TCB, where a majority of such effort would be directed to the assurance of consistency between the operational model and the TCB. Such verification may require services of highly-educated and skilled software developers, e.g., having PhDs and post doctorate degrees. In sum, the assurance of consistency between the operational model and the TCB may be lengthy and complex. Therefore, it is desirable to provide an efficient method for assuring consistency between the operational model and the TCB (i.e., as indicated in (iii) above) based on a prescribed level confidence, i.e., a predetermined level of confidence sufficient to assure trustedness.

As noted, trustedness may be defined in terms of the predetermined level of confidence that is appropriate for a particular deployment of the microvisor. Such a level of confidence may be quantified based on the operational model. Indeed, a definition of trustedness may be rooted in commercial value of the microvisor. That is, a microvisor with a higher level of confidence with respect to manifesting the security property than that of another virtualization system has a greater commercial value. Approaching a 100% level of (i.e., complete) confidence requires formal verification (including comprehensive compliance testing) of the entire TCB, which may be too extensive and, thus, impractical for many deployments. Therefore, a practical solution may mandate a predetermined level of confidence (e.g., not less than 90%) with associated risks (e.g., vulnerabilities) that is appropriate for a particular deployment. It should be noted that the predetermined level of confidence with respect to the security property may be prescribed with respect to code that has been proven correct, i.e., code that has been compliance tested and determined to be sufficiently correct for product commercialization. As such, the predetermined level of confidence (i.e., assurance) in trustedness may be increased (and the associated risk reduced) with additional compliance testing. That is, assurance in trustedness may monotonically increase with an amount of compliance testing.

Figure 6:
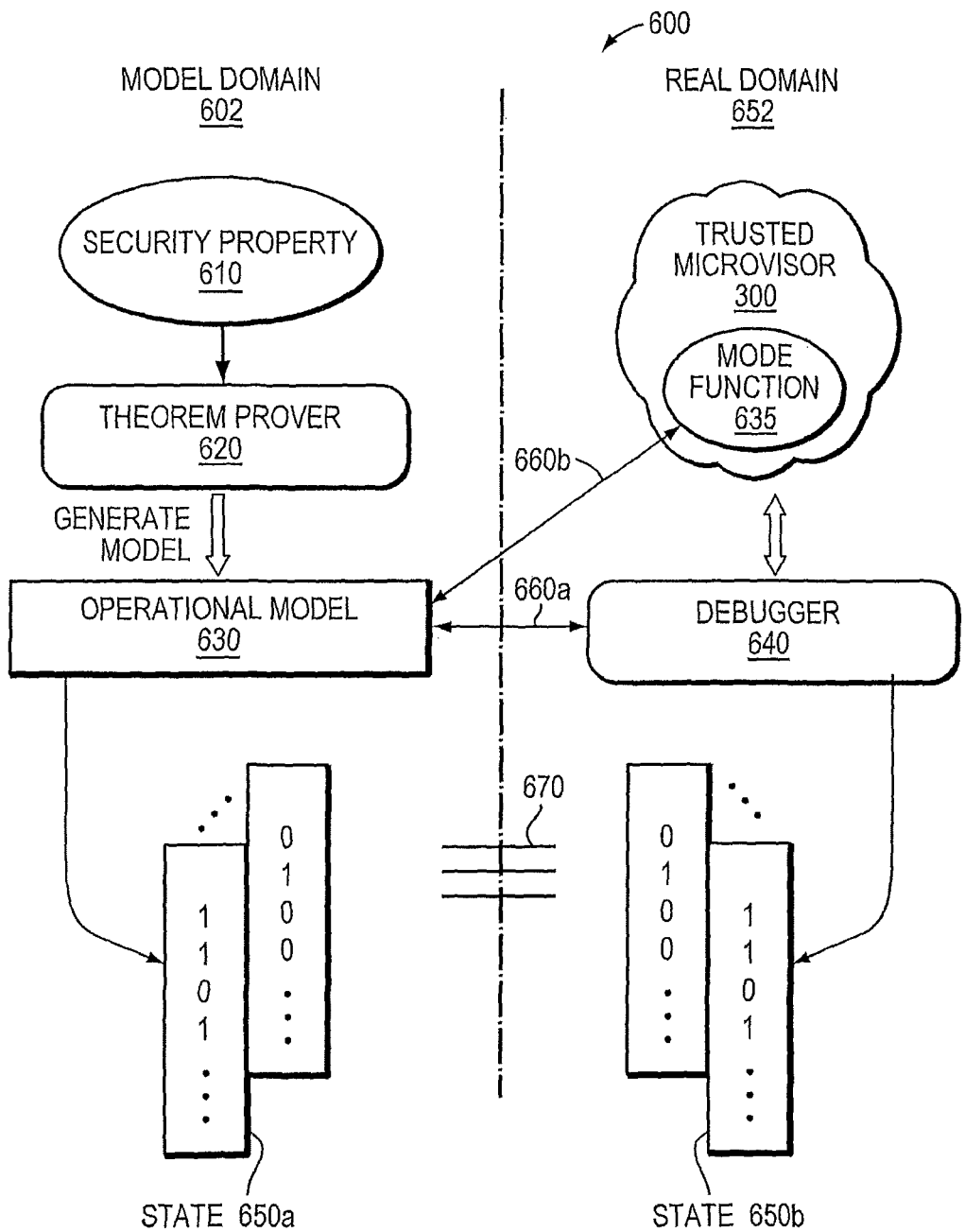
FIG. 6 is a block diagram of an enhanced verification arrangement that may be advantageously used with one or more embodiments described herein.

In an embodiment, the microvisor 300 may be configured to enable rapid compliance testing in accordance with an enhanced verification procedure that dramatically reduces the man years required to achieve near formal (i.e., greater than 90% confidence) verification of the TCB. As noted, the enhanced verification may be performed in a computing environment separate and apart from the network environment deploying the trusted microvisor. FIG. 6 is a block diagram of the enhanced verification arrangement that may be advantageously used with one or more embodiments described herein. The enhanced verification arrangement 600 may include a model domain 602 which provides the ability to verify (i.e., logically prove) the security property 610 against the operational model 630. The verification arrangement 600 may also include a real domain 652 that executes the microvisor 300 as the actual object (i.e., binary code) sought to be assured of trustedness. Assurance of trustedness is provided when (i) the security property 610 is demonstrated within the model domain 602 and (ii) the real domain 652 sufficiently conforms to the model domain 602.

The enhanced verification arrangement 600 may further include a "mode" function 635 of the microvisor 300 that captures a state 650*b* of the microvisor to ensure consistency with a corresponding state 650*a* of the operational model 630. Illustratively, the mode function 635 may be software code (i.e., a state descriptor) configured to capture (e.g., via a dump operation) the state 650*b* of the microvisor (e.g., at a point in time) and to express that state in a manner that can be compared with extracted state 650*a* from the operational model 630. Illustratively, the mode function implements a function to provide a view or recording of the state (e.g., dump state operation), which dumps the state 650*b* of the microvisor 300 after a number of instructions of the microvisor have executed. A checkpoint communication 660*a* between a debugger 640 (e.g., a control module) in the real domain 652 and the operational model 630 may be used to initiate capture of the states 650*a,b* respectively for comparison. Alternatively, a checkpoint communication 660*b* between the operational model 630 in the model domain 602 and the mode function 635 of the microvisor in the real domain 652 may be used to initiate capture of the states 650*a,b* respectively for comparison. The checkpoint and state comparison may occur automatically (i.e., without human intervention) thereby to reduce an otherwise labor intensive process. In an embodiment, the operational model 630 may be further configured to analyze conformance to the security property 610. Such conformance between the operational model 630 and the microvisor 300 may be assured or verified (i.e., to the predetermined level of confidence) when a sufficient number of states (related to security) match between the microvisor and the operational model. In other words, conformance to the security property 610 is verified, e.g., for the predetermined level of confidence, when there is sufficient test coverage between the model domain 602 and the real domain 652.

For example, trustedness (i.e., a predetermined level of confidence in manifestation of the security property) of the microvisor 300 may be verified (i.e., confidence elevated) by demonstrating that an instruction issued by a module (e.g., VMM 0) external to the TCB and having one or more arguments configured to alter an expected behavior or state of the microvisor related to the security property results in a violation (i.e., generation of a capability violation) such that the instruction is rejected (reply with error code) or ignored and prevented from execution by the microvisor. To that end, binary code of the microvisor 300 may be tested to execute an input (e.g., an operation manifested as a hypercall issued by VMM 0 to access a kernel resource) with a resulting output (e.g., denial of access to the resources manifested as a capability violation) and an associated operational state 650*b*. Illustratively, the operational state may be expressed as a microvisor dump object provided by the state descriptor. The operational model 630 may be similarly tested to execute the inputs with resulting outputs and associated operational states 650*a* (e.g., expressed as model dump objects). The microvisor and model dump objects may then be compared, e.g. using conventional software testing methodologies that include an automated testing environment to verify consistency. Illustratively, such automated, on-demand state-based consistency verification (e.g., compliance testing) between the operational model 630 and the TCB (i.e., trusted microvisor 300) enables comparison 670 of respective operational states so as to verify that the TCB demonstrates the security property 610.

Figure 7:
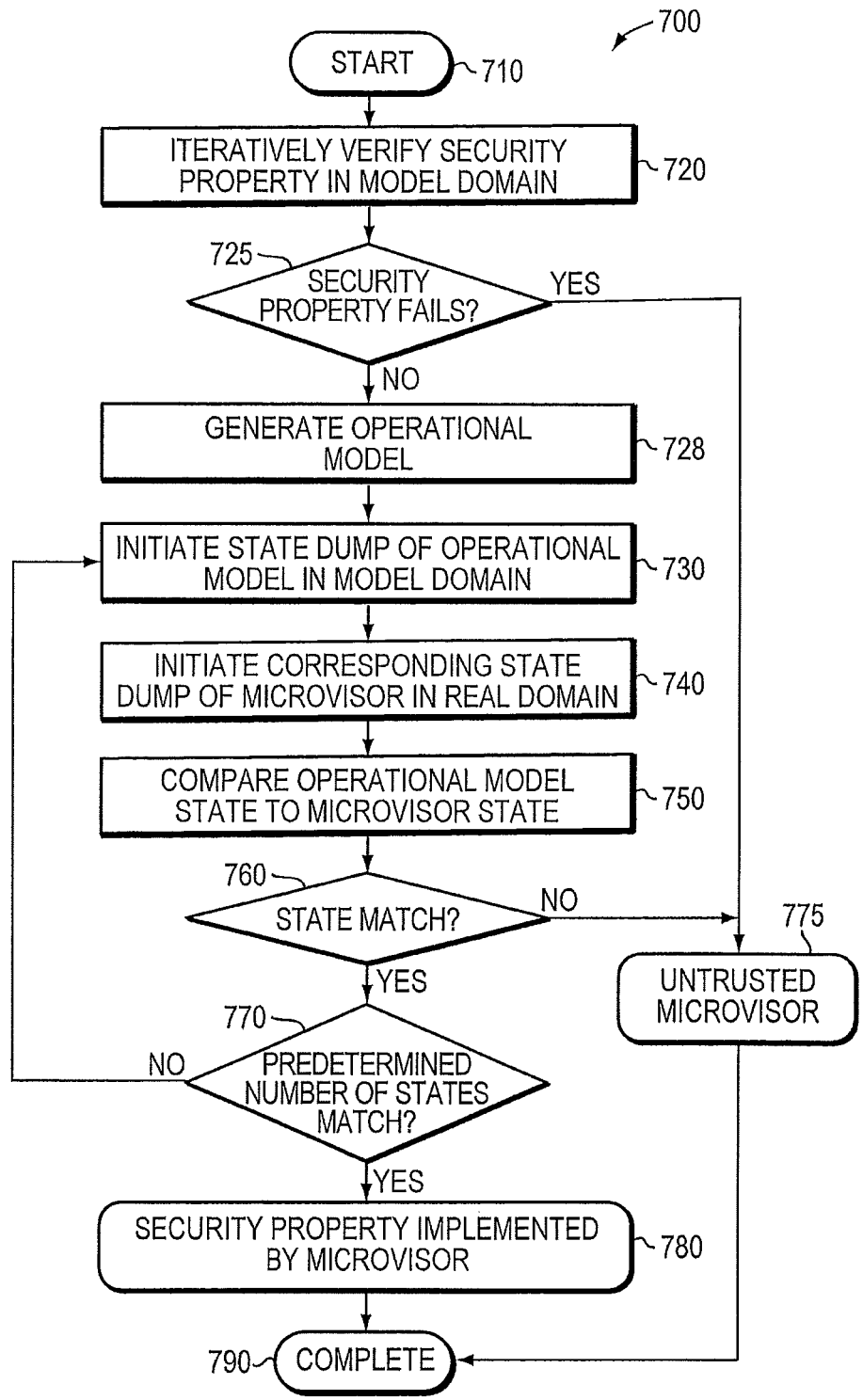
FIG. 7 is an example procedure for enhanced verification that may be advantageously used with one or more embodiments described herein.

FIG. 7 is an example procedure for enhanced verification that may be advantageously used with one or more embodiments described herein. The procedure 700 starts at step 710 and continues to step 720 where the security property is iteratively verified in the model domain by the theorem prover (i.e., logical verification that the operational model manifests the security property). At step 725, a determination is made as to whether the security property fails. If so, the microvisor is deemed untrusted at step 775 and the procedure completes at step 790. However, if the security property does not fail (i.e., the operational model progresses in manifesting the security property), the operational model may be generated from the theorem prover at step 728 to render an executable operational model (e.g., a binary compiled from generated OCaml code, or Haskell bytes-codes).

A state dump of the operational model (i.e., the operational model executable) is initiated in the model domain at step 730 and, at step 740, a corresponding state dump of the microvisor is initiated in the real domain. At step 750, the state dumps of the operational model and microvisor are compared and, at step 760, a determination is made as to whether the states match. If not, the microvisor is deemed untrusted at step 775 and the procedure completes at step 790. However, if the states match, then a determination is made (step 770) as to whether a predetermined number of states (related to the security property) have been found to match. If not, the procedure returns to step 730 where a state (i.e., a next state) dump of the operational model iteratively continues. If the predetermined number of states have been found to match, then the predetermined number of matched states correspond to a predetermined level of confidence that the security property is implemented by the microvisor (step 780), thereby rendering the microvisor a trusted microvisor. The procedure then completes at step 790.

Deployment of Trusted Microvisor in Virtualization System

Figure 8:
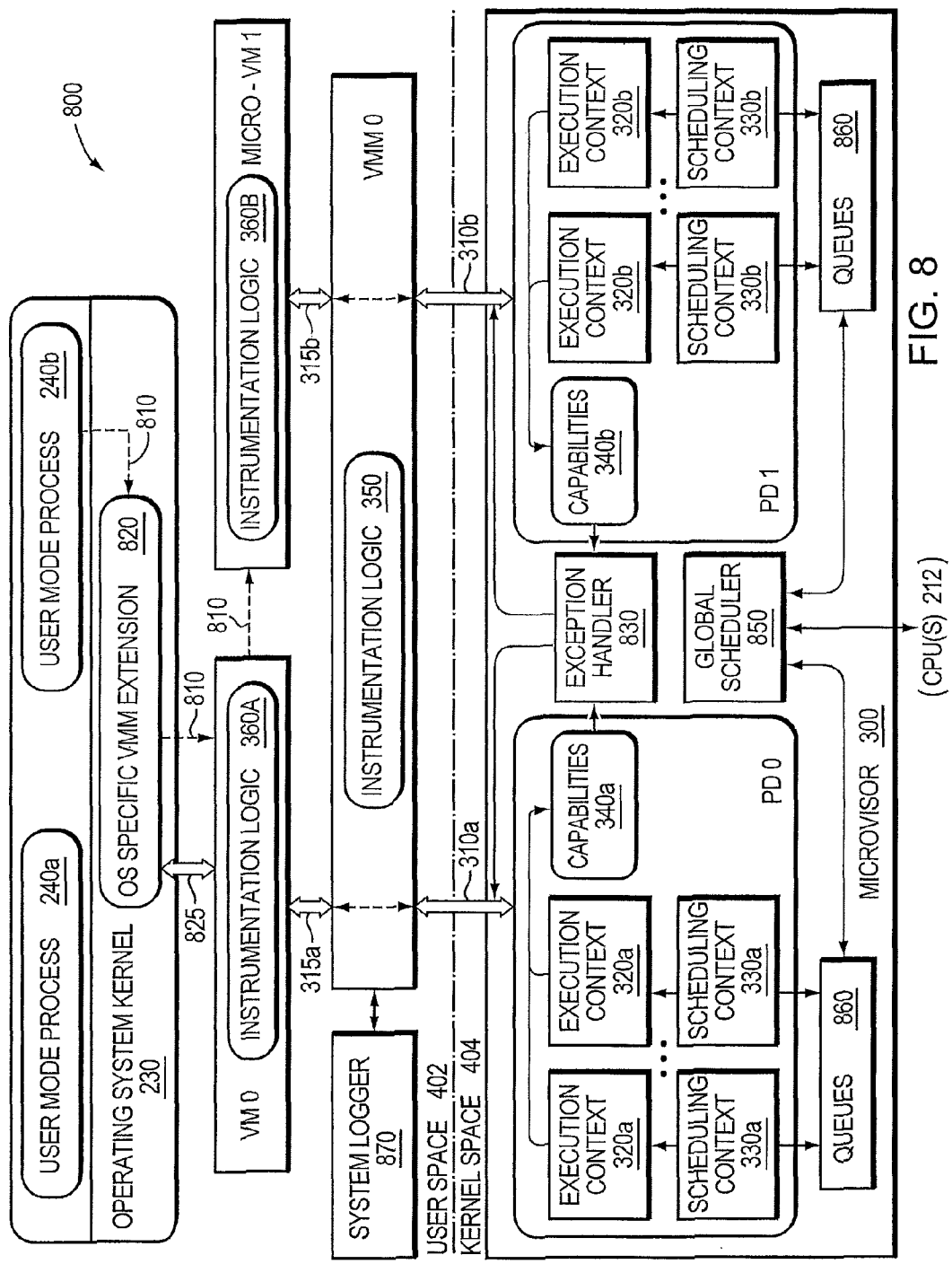
FIG. 8 is a block diagram of a deployment of the trusted, threat-aware microvisor in a virtualization system that may be advantageously used with one or more embodiments described herein.

FIG. 8 is a block diagram of deployment of the trusted threat-aware microvisor in a virtualization system that may be advantageously used with one or more embodiments described herein. Illustratively, the virtualization system 800 may be enhanced to provide an exploit and malware detection system (e.g., using static and dynamic analysis) executing on the node 200 of network environment 100. The microvisor 300 may be deployed as a module of the virtualization system 800 that executes in the kernel space 402 of the micro-virtualization architecture 400. The virtualization system also includes VMM 0 and its spawned VMs (e.g., VM 0 and micro-VM 1), as well as operating system kernel 230 and user mode processes 240, each of which executes in user space 402 of the architecture. It should be noted that the virtualization system 800 depicts the deployment of the microvisor after creation and initial configuration of the user space processes (modules) and, thus, does not include the root task 420.

As noted, the microvisor 300 executes at the highest privilege level of the CPU, while VMM 0 and the spawned VMs execute at the highest (logical) privilege level of the microvisor. In contrast, the operating system kernel 230 executes under control of the microvisor at a privilege level (i.e., a logical privilege level) lower than a highest privilege level of the microvisor, but at a higher CPU privilege level than that of the user mode processes 240. Privileges are logical constructs illustratively defined by operations that may be performed (executed) at the various privilege levels of the micro-virtualization architecture. That is, operations that may be executed by the microvisor (at the highest CPU privilege level) may not be executed by VMM 0 at its privilege level. Similarly, operations that may be executed by VMM 0 (at the highest microvisor privilege level) may not be executed by the operating system kernel 230 (at a lower microvisor privilege level). As an example of the latter, VMM 0 may execute an operation (e.g., via a hyper-call) to instruct the microvisor to create (clone) a protection domain, whereas the operating system kernel may not execute such an operation. Operations of the various privilege levels are expressed and enforced through the use of capabilities 340 of the microvisor 300, i.e., privileges are bound to capabilities as configured at the microvisor. Illustratively, instrumentation logic 350, 360 may configure the capabilities 340 of the protection domains within the microvisor to enable analysis of interception points. For example, assume access to a memory page is configured (via capabilities) as read-only for a protection domain and a process attempts to write to that memory page. Such a memory access request is an example of an interception point, which may cause (trigger) a violation of a capability (e.g., a trap) and which may result in analysis of the process and the request by, e.g., switching between the privilege levels of the architecture.

As used herein, a hyper-call is generally similar to a system call, with a primary difference that the request for service is directed to the microvisor instead of the operating system kernel. Specifically, the micro-virtualization architecture provides a small, limited set of hyper-calls, each having limited arguments, as a way to switch between privilege levels of the architecture. Whereas a system call may enable switching between a user mode level (e.g., of user mode process 240) and a kernel level (e.g., of operating system kernel 230) of the operating system, a hyper-call enables switching from user space 402 to kernel space 404 of the micro-virtualization architecture 400.

In an embodiment, the hyper-calls are implemented as inter process communication (IPC) messages exposed (available) to VMM 0, VM 0 and any spawned micro-VMs. The hyper-calls are generally originated by VMM 0 and directed to the microvisor 300 over privileged interface 310, although VM0 and the micro-VMs may also originate one or more hyper-calls (IPC messages) directed to the microvisor over privileged interface 315. However, the hyper-calls originated by VM 0 and the micro-VMs may be more restricted than those originated by VMM 0. For example, micro-VM 1 may attempt to issue a hyper-call that instructs the microvisor to create (clone) a protection domain, but the capabilities 340b of protection domain PD 1 (which is bound to micro-VM 1) may limit or preclude successful execution of such a hyper-call. In contrast, the hyper-calls are not available to the operating system kernel 230 and, as such, the kernel may not issue such calls to the microvisor. Notably, a hyper-call (e.g., IPC message) may be generated when the encapsulated process 240 in the micro-VM attempts to access a kernel resource.

The operating system kernel 230 may be configured to include an operating system (OS) specific VMM extension 820 adapted to communicate with VMM 0. The OS specific VMM extension 820 illustratively contains executable machine code in the form of logic configured to provide an interface to VMM 0 (and, in particular, the instrumentation logic 350) that allows introspection (examination and/or interception) of contents of internal structures of the operating system kernel 230. Such introspection may involve examination of data structures of the operating system kernel in a manner that obviates duplication of (i.e., without duplicating) those structures. Accordingly, the OS specific VMM extension 820 may contain computer executable instructions executed by the CPU 212 to perform operations that implement communication with, and introspection by, VMM 0. For example, assume it is desirable to acquire identifications (IDs) of the user mode processes 240 running in the operating system and that the process IDs are stored in a data structure, e.g., the process table 270, of the operating system kernel 230. Instead of having to duplicate that data structure and its contents, the VMM 0 can instruct the OS specific VMM extension 820 to examine the process table 270 and provide the ID of a process 240. Illustratively, VMM 0 may communicate with the operating system kernel 230 (i.e., the OS specific VMM extension 820) over a defined application programming interface (API) 825.

As noted, the execution context 320 of a thread (e.g., of a user mode process 240) executing on a CPU 212 (e.g., as a virtual CPU) is tightly linked to a scheduling context 330. In an embodiment, the scheduling context 330 may include information defining a priority of execution for its linked execution context, e.g., as implemented by one or more queues 860. Once linked to its execution context 320, the scheduling context 330 may be placed (inserted) onto an appropriate queue 860 having a defined priority of execution. A global scheduler 850 of the microvisor may cooperate with the scheduling context 330 to schedule the context for execution on a CPU 212. Multiple execution contexts 320 may be bound to a same CPU 212 or multiple CPUs 212. Illustratively, the global scheduler 850 manages the queues 860 of scheduling contexts thereby to manage the CPUs 212 in an orderly manner. To that end, the global scheduler 850 may examine the queues 860 and determine which scheduling context 330 (execution context 320) may run on which CPU 212. The global scheduler 850 may then dispatch the scheduling context 330 to the appropriate CPU 212 for execution of its linked execution context 320.

In an embodiment, the microvisor 300 may be configured to perform scheduling of execution contexts 320 and verification of operational requests by the execution contexts with respect to capabilities 340. If there is a violation of the capabilities for a protection domain, a trap (e.g., an exception, such as a page fault or general protection fault) may be generated by the CPU (or other hardware) and serviced by an exception handler 830 of the microvisor. For example, if a process 240 attempts to access a resource to which the capability specifies it does not have permission, the CPU may generate the trap and the exception handler may report the violation to, e.g., VMM 0 for analysis. In addition, the microvisor may provide VMM 0 with state information associated with the execution context 320 executing at the time of the trap. The capability violation may trigger invocation of the instrumentation logic 350 of VMM 0 to determine whether the process is suspicious or even an exploit and, if so, an appropriate course of action. Depending on the seriousness of the violation, VMM 0 may decide to, e.g., change a register value, issue a capability change or spawn a micro-VM (micro-VM 1). VMM 0 may then provide instructions to the microvisor (PD 0) as to a course of action.

Illustratively, the instrumentation logic 350 of VMM 0 may include monitoring logic configured to monitor and collect capability violations in response to one or more interception points thereby to infer an exploit. Inference of an exploit may also be realized through sequences of interception points wherein, for example, a system call followed by another system call having certain parameters may lead to an inference that the process sending the calls is an exploit. The interception point thus provides an opportunity for VMM 0 to perform "light-weight" analysis (e.g., static analysis) to evaluate a state of the process in order to detect a possible exploit without requiring any policy enforcement. That is, policy enforcement is not necessary to detect the process as an exploit. VMM 0 may then decide to perform dynamic analysis by spawning a micro-VM and configure the capabilities of its protection domain to enable deeper monitoring and analysis (e.g., through interception points and capability violations for dynamic analysis) in order to determine whether the process is an exploit or contains malware. Notably, the analysis may also classify the process as a type of exploit (e.g., a stack overflow) and may even identify the exploit or malware, e.g., using pre-defined anomalous behaviors (monitored activity) of verified exploits and malware. As a result, the invocation of instrumentation and monitoring logic of VMM 0 and its spawned VMs in response to interception points originated by operating system processes and capability violations generated by the microvisor advantageously enhance the virtualization system described herein to provide an exploit and malware detection system configured for run-time security analysis (i.e., dynamic analysis) of the operating system processes executing on the node.

VMM 0 may also log the state of the monitored process within system logger 870. In an embodiment, the state of the process may be realized through the contents of the execution context 330 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 870 to another node 200 of the network environment 100 by, e.g., forwarding the state as one or more IPC messages through VMM 0 (VM 0) and OS specific VMM extension 820 and onto a network protocol stack of the operating system kernel. The network protocol stack may then format the messages as one or more packets for transmission over the network 120, 130. Determination of the presence of an exploit or malware may also be reported to the graphical display (e.g., on the user interface) and as a notification to an administrator (e.g., email and wireless text message).

While there have been shown and described illustrative embodiments for providing a trusted threat-aware microvisor for deployment in a virtualization system executing on a node of a network environment, it is to be understood that various other adaptations and modifications may be made within the spirit and scope of the embodiments herein. For example, embodiments have been shown and described herein with relation to the root task embodied as a non-long lived process that terminates after creation and configuration of the user space modules. However, the embodiments in their broader sense are not so limited and may, in fact, allow for the root task to remain as a dormant (sleeping) process until an administrative task is requested, at which time the root task may be invoked (awoken).

In addition, embodiments have been shown and described herein with relation to a chain of loading configured to securely launch the microvisor as the first software entity loaded on the node during a boot process. Again, the embodiments in their broader sense are not so limited and may allow for a chain of loading configured to ensure that any previously-loaded software entities (e.g., Windows® operating system kernel) are authentic (thus presumed adequately trusted) prior to launching of the trusted microvisor. In such an embodiment, loading of the microvisor 300 and root task 420 may be performed in accordance with a "late loading" procedure (i.e., loaded later than code loaded directly by the UEFI). Illustratively, the late loading procedure may shift the privilege level of the previously-loaded software entities, such that those software entities operate as processes controlled by the trusted microvisor. That is, the trusted microvisor subsumes the highest privilege level of the hardware (e.g., CPU) and delegates a privilege level (i.e., a logical privilege level) lower than a highest privilege level of the microvisor to the previously-loaded software. An example of a late loader is Deep Defender from Intel Corporation, which also provides protection (e.g., isolation of memory space and code base) enforcement.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a central processing unit (CPU) adapted to execute a module, a virtual machine monitor (VMM), and a trusted microvisor; and
a memory configured to store the trusted microvisor as a trusted computing base (TCB), the trusted microvisor configured to enforce a first security property that prevents alteration of a first state related to the first security property of the trusted microvisor by the module, wherein trustedness of the trusted microvisor provides a predetermined level of confidence that the first security property is implemented by the trusted microvisor, and wherein the trusted microvisor is configured to generate a capability violation in response to the module issuing a first instruction having an argument configured to alter the first state related to the first security property of the trusted microvisor such that the first instruction is prevented from execution by the trusted microvisor, the memory further storing the VMM that, in response to determining that the first instruction is suspicious, is configured to spawn a micro virtual machine (micro-VM) that executes the first instruction, the micro-VM configured to i) monitor a second instruction that attempts to alter a second state related to the first security property of the trusted microvisor and ii) support a determination of whether the module is malicious.

2. The system of claim 1 wherein the trusted microvisor is configured to enforce the second security property different from the first security property, and wherein trustedness of the trusted microvisor provides the predetermined level of confidence that the second security property is implemented by the trusted microvisor.

3. The system of claim 2 wherein the CPU is further adapted to execute the VMM to, in response to the determination that the module is malicious, send an alert.

4. The system of claim 1 wherein the module is external to the TCB.

5. The system of claim 1 wherein the CPU is further adapted to execute a root task stored in the memory, wherein the root task is configured to cooperate with the trusted microvisor to load and initialize the module, wherein the module is external to the TCB, and wherein the trusted microvisor is a first software entity loaded during a boot process.

6. The system of claim 1 wherein the CPU is further adapted to execute a root task stored in the memory, wherein the module is external to the TCB, wherein the root task is configured to cooperate with the microvisor to shift a privilege level of the module such that the module executes under control of the trusted microvisor, wherein during a chain of loading the module is loaded prior to the trusted microvisor, and wherein the trusted microvisor is authenticated prior to launch.

7. The system of claim 1 wherein the trusted microvisor is configured to implement the first security property such that no module external to the TCB modifies a state related to security of the trusted microvisor without authorization.

8. The system of claim 2 wherein the trusted microvisor is configured to implement the second security property such that no module of the TCB modifies a state related to security of the trusted microvisor without authorization.

9. The system of claim 1 wherein the first security property enforces a security policy, and wherein the security policy provides that components of the TCB are immutable.

10. A method comprising:
enforcing, by a trusted microvisor executing on an endpoint of a network, a first security property that prevents alteration of a first state related to the first security property of the trusted microvisor by a module, wherein trustedness of the trusted microvisor provides a predetermined level of confidence that the first security property is implemented by the trusted microvisor;
generating, by the trusted microvisor, a capability violation in response to the module issuing a first instruction having an argument configured to alter the first state related to the first security property of the trusted microvisor;
preventing, by the trusted microvisor, execution of the first instruction; and
in response to determining that the first instruction is suspicious, spawning, by a virtual machine monitor (VMM) executing on the endpoint, a micro-virtual machine (micro-VM) that executes the first instruction, the micro-VM configured to i) monitor a second instruction that attempts to alter a second state related to the first security property of the trusted microvisor and ii) support determination of whether the module is malicious.

11. The method of claim 10 wherein the trusted microvisor is configured to enforce the second security property different from the first security property, and wherein trustedness of the trusted microvisor provides the predetermined level of confidence that the second security property is implemented by the trusted microvisor.

12. The method of claim 11 further comprising:
in response to the determination that the module is malicious, sending, by the VMM, an alert.

13. The method of claim 10 wherein the module is external to the TCB.

14. The method of claim 10 further comprising:
loading and initializing, by a root task executing on the endpoint, the module, wherein the module is external to the TCB, and wherein the trusted microvisor is a first software entity loaded during a boot process.

15. The method of claim 10 further comprising:
loading and initializing, by a root task executing on the endpoint, the module, wherein the module is external to the TCB, wherein during a chain of loading the module is loaded prior to the trusted microvisor, wherein the trusted microvisor is authenticated prior to launch; and
shifting a privilege level of the module such that the module executes under control of the trusted microvisor.

16. The method of claim 10 wherein the trusted microvisor is configured to implement the first security property such that no module external to the TCB modifies a state related to security of the trusted microvisor without authorization.

17. The method of claim 10 wherein the trusted microvisor is configured to implement the second security property such that no module of the TCB modifies a state related to security of the trusted microvisor without authorization.

18. A non-transitory computer readable medium including program instructions for execution on a processor of an endpoint on a network, the program instructions configured to:
enforce a first security property that prevents alteration of a first state related to the first security property of a trusted microvisor of the endpoint by a module of the endpoint, wherein trustedness of the trusted microvisor provides a predetermined level of confidence that the first security property is implemented by the trusted microvisor;
generate a capability violation in response to the module issuing a first instruction having an argument configured to alter the first state related to the first security property of the trusted microvisor;
prevent execution of the first instruction; and
in response to determining that the first instruction is suspicious, spawn a micro-virtual machine (micro-VM) that executes the first instruction, the micro-VM configured to i) monitor a second instruction that attempts to alter a second state related to the first security property of the trusted microvisor and ii) support determining whether the module is malicious.

19. A system comprising:
a central processing unit (CPU) adapted to execute a trusted virtualization layer and a virtual machine monitor (VMM), the trusted virtualization layer disposed directly on hardware of the system to operate at a highest privilege level of the CPU; and
a memory configured to store the trusted virtualization layer as a trusted computing base (TCB), the trusted virtualization layer configured to enforce a first security property that prevents alteration of a first state related to the first security property of the trusted virtualization layer by a module external to the TCB, wherein trustedness of the trusted virtualization layer provides a predetermined level of confidence that the first security property is implemented by the trusted virtualization layer, and wherein the trusted virtualization layer is configured to generate a capability violation in response to the module issuing a first instruction configured to alter the first state related to the first security property of the trusted virtualization layer such that the first instruction is prevented from execution by the trusted virtualization layer, the memory further configured to store the VMM that, in response to determining that the first instruction is suspicious, is configured to spawn a virtual machine (VM) that executes the first instruction, the VM configured to i) monitor a second instruction that attempts to alter a second state related to the first security property of the trusted virtualization layer and ii) support a determination of whether the module is malicious.

20. The system of claim 19 wherein the VM serves as a container that is restricted to an operating system process exclusive of an operating system.

21. The system of claim 20 wherein the VM is configured to restrict access to a kernel resource by the operating system process.

22. The system of claim 21 wherein the kernel resource comprises a memory region having associated access permissions defined by capabilities bound to the VM.

23. The system of claim 22 wherein the VM is configured to one of enlarge and shrink the memory region to enable access to memory pages with the memory region.

24. The system of claim 19 wherein the VM comprises a container associated with an allocation of a portion of the memory for execution of an operating system process.

25. The system of claim 19 wherein the trusted virtualization layer is further configured to virtualize hardware resources of the system.

26. A method comprising:
enforcing, by a virtualization layer disposed directly on hardware of an endpoint of a network, a first security property that prevents alteration of a first state related to the first security property of the virtualization layer by a module, wherein the first security property is implemented by the virtualization layer to a predetermined level of confidence;
generating, by the virtualization layer, a capability violation in response to the module issuing a first instruction configured to alter the first state related to the first security property of the virtualization layer;
preventing, by the virtualization layer, execution of the first instruction; and
in response to determining that the first instruction is suspicious, spawning, by a virtual machine monitor (VMM) of the endpoint, a virtual machine (VM) that executes the first instruction, the VM configured to i) monitor a second instruction that attempts to alter a second state related to the first security property of the virtualization layer and ii) support a determination of whether the module is malicious.

27. The method of claim 26 wherein the VM serves as a container that is restricted to an operating system process exclusive of an operating system.

28. The method of claim 26 wherein the VM is a container configured to restrict access to kernel resources by an operating system process.

29. The method of claim 26 further comprising virtualizing, by the virtualization layer, hardware resources of the system.

30. A non-transitory computer readable medium including program instructions for execution on a processor of an endpoint on a network, the program instructions configured to:
enforce a first security property that prevents alteration of a first state related to the first security property of a trusted virtualization layer of the endpoint by a module of the endpoint, wherein trustedness of the trusted virtualization layer provides a predetermined level of confidence that the first security property is implemented by the trusted virtualization layer;
generate a capability violation in response to the module issuing a first instruction configured to alter the first state related to the first security property of the trusted virtualization layer;
prevent execution of the first instruction; and
in response to determining that the first instruction is suspicious, spawn a virtual machine (VM) that executes the first instruction, the VM configured to i) monitor a second instruction that attempts to alter a second state related to the first security property of the trusted virtualization layer and ii) support determining whether the module is malicious.

* * * * *